United States Patent
Regev et al.

(10) Patent No.: US 6,934,797 B2
(45) Date of Patent: Aug. 23, 2005

(54) COUNTER IN CAM WORD

(75) Inventors: Alon Regev, Woodland Hills, CA (US); Zvi Regev, West Hills, CA (US)

(73) Assignee: Micron Technology, Inc., Boise, ID (US)

( * ) Notice: Subject to any disclaimer, the term of this patent is extended or adjusted under 35 U.S.C. 154(b) by 290 days.

(21) Appl. No.: 10/330,206

(22) Filed: Dec. 30, 2002

(65) Prior Publication Data

US 2004/0128435 A1 Jul. 1, 2004

(51) Int. Cl.[7] ............................................... G06F 12/00
(52) U.S. Cl. ........................................ 711/108; 365/49
(58) Field of Search ................................ 711/108, 154; 365/49; 710/52, 310

(56) References Cited

U.S. PATENT DOCUMENTS

| | | | | |
|---|---|---|---|---|
| 6,349,049 B1 | * | 2/2002 | Schoy | 365/49 |
| 6,351,143 B1 | * | 2/2002 | Guccione et al. | 326/40 |
| 6,374,325 B1 | * | 4/2002 | Simpson et al. | 711/108 |
| 6,591,317 B1 | * | 7/2003 | Schzukin et al. | 710/52 |
| 6,785,759 B1 | * | 8/2004 | Beukema et al. | 710/310 |
| 2003/0115426 A1 | * | 6/2003 | Rosenbluth et al. | 711/154 |

* cited by examiner

*Primary Examiner*—Nasser Moazzami
(74) *Attorney, Agent, or Firm*—Dickstein Shapiro Morin & Oshinsky LLP (57) ABSTRACT

A method and apparatus for determining the age and frequency of use of words within a Content Addressable Memory (CAM) is disclosed. The CAM utilizes an aging process which determines the level or frequency of activity on every entry in the database, and purges or invalidates entries in the database with very low or infrequent activity.

30 Claims, 6 Drawing Sheets

COUNTER IN CAM WORD

FIELD OF THE INVENTION

The invention relates to Content Addressable Memories (CAMs) and a method and apparatus for providing a counter showing usage of a specific CAM word.

BACKGROUND OF THE INVENTION

A content addressable memory (CAM) is a memory device that accelerates any application requiring fast searches of a database, list, or pattern, such as in database machines, image or voice recognition, or computer and communication networks. CAMs provide benefits over other memory search algorithms by simultaneously comparing the desired information (i.e., data input to the device or in the comparand register) against the entire list of pre-stored entries. As a result of their unique searching algorithm, CAM devices are frequently employed in network equipment, particularly routers and switches, computer systems and other devices that require rapid content searching.

In order to perform a memory search in the above-identified manner, CAMs are organized differently than other memory devices (e.g., random access memory (RAM), dynamic RAM (DRAM), etc.). For example, data is stored in a RAM in a particular location, called an address. During a memory search on a RAM, the user supplies the address and gets back the data stored in that address (location).

In a CAM, however, data is stored in locations in a somewhat random fashion. The locations can be selected by an address, or the data can be written into a first empty memory location (also known as the Next Free Address or NFA). Once information is stored in a memory location, it is found doing a memory search by comparing every bit in any memory location with every bit of data in a comparand register circuit. When the content stored in the CAM memory location does not match the data placed in the comparand register, the local match detect circuit associated with the CAM memory location returns a no-match indication. When the content stored in the CAM memory location matches the data placed in the comparand register, the local match detect circuit associated with the CAM memory location returns a match indication. If one or more of the local match detect circuits return a match indication then the CAM device outputs a match indication. If no local match detect circuits return a match indication then the CAM device outputs a no-match indication. In addition, if a match is found then the CAM returns the identification of the address location in which the matching data is stored (or one of the address locations in which matching data was stored if more than one memory location contained matching data). Thus, with a CAM, the user supplies the data and gets back an indication of an address where a matching data is stored in the memory.

CAMs are typically used in data network communication, wherein the CAM stores the database of clients on the network, and provides the means for search of clients addresses. Since clients come on line and then go off line, keeping all the addresses of all the clients, all the time in the database, is very wasteful. For this reason, various method are employed in deciding what data should always be kept in the database, and what data could be removed from the database, and at what time. One such method is based on the age of each entry in the database. For aging purposes, every CAM word includes a number of bits dedicated as time stamp bits. When new data is stored in the CAM, a code representing the time of the storage operation is written into the dedicated time stamp bits. Then every time data in a word matches the data in the comparand register, a match flag is activated, and the location of the matching data is provided. This operation is immediately followed by a write operation wherein the time stamp bits of the matching CAM word are loaded with a code representing the current time. Every so often, a search is conducted on the time stamp bits in the entire CAM to detect and purge CAM words which have not been matched for some time. This method though very popular does not take into account how frequently a CAM word is matched, indicating activity at that client. Consequently, a CAM device which utilizes information incorporating frequency of word matches is desired.

BRIEF SUMMARY OF THE INVENTION

This invention provides the means to purge or age a CAM based on a least used policy. A counter is attached to every word in the CAM: Upon initialization of the CAM all the counters are reset to zero. Every time a data in a CAM word matches the data in the comparand register, the counter associated with the matching CAM word is incremented. Periodically a search operation is conducted on all the counters in the CAM to identify counters with a low count. A low count in a counter indicates infrequent access to the client whose address is stored in the CAM word associated with the low count counter, indicating that this location in the CAM may be purged and made available to store new data. Once the purging process is completed, all the counters in the CAM are reset to zero thereby starting another counting period.

DETAILED DESCRIPTION OF THE INVENTION

Figure 1:
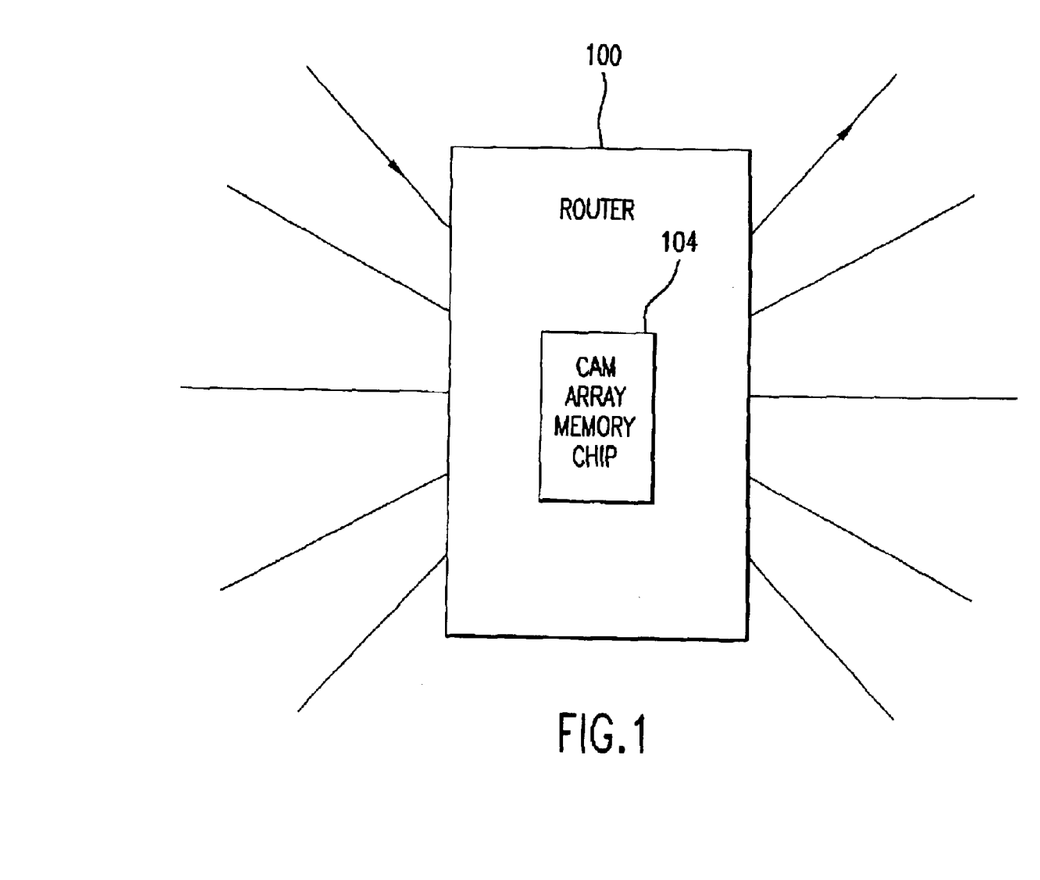
FIG. 1 is a simplified block diagram of a router employing a CAM array equipped with a multi-match circuit of the present invention.

FIG. 1 is a simplified block diagram of a router 100 connected to a CAM array memory chip 104 as may be used in a communications network, such as, e.g., part of the Internet backbone. The router 100 contains a plurality of input lines and a plurality of output lines. When data is transmitted from one location to another, it is sent in a form known as a packet. Oftentimes, prior to the packet reaching its final destination, that packet is first received by a router, or some other device. The router 100 then decodes that part of the data identifying the ultimate destination and decides which output line and what forwarding instructions are required for the packet.

Generally, CAMs are very useful in router applications because of their ability for instantaneous search of a large database. As a result, when a packet is received by the router 100, the router already has a table of forwarding instructions for each ultimate destination stored within its CAM. Therefore, only that portion of the packet that identifies the sender and recipient need be decoded in order to perform a search of the CAM to identify which output line and instructions are required to pass the packet onto a next node of its journey.

Figure 2:
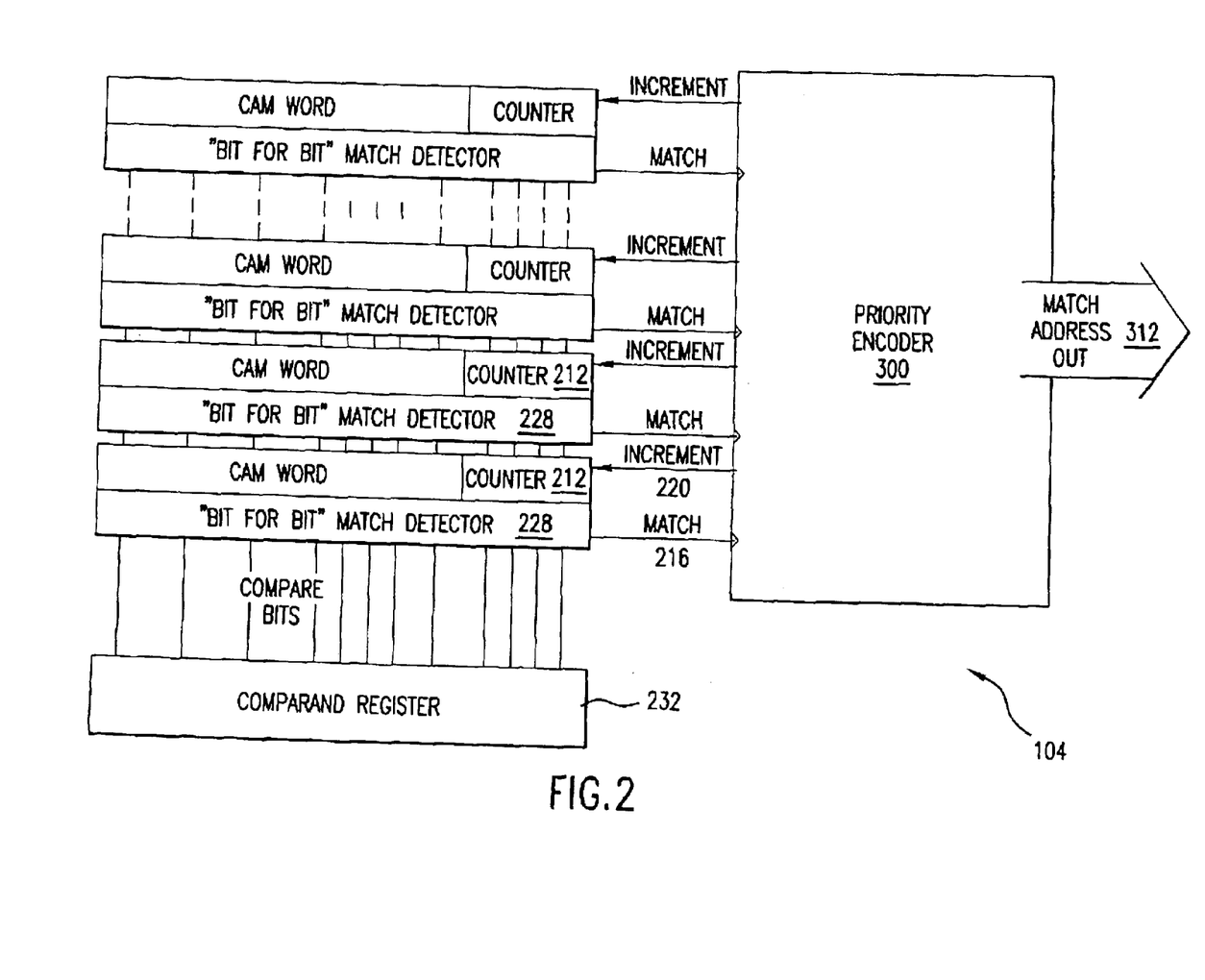
FIG. 2 shows an exemplary embodiment of the invention.

The present invention utilizes an aging process which determines the level or frequency of activity on every entry in the CAM database, and purges or invalidates entries in the database with infrequent activity. The CAM array 104 of the present invention is shown in FIG. 2. A plurality of CAM word storage locations each have an associated match detector 228. All of the match detectors 228 are connected to a priority encoder 300 through match lines 216. Each CAM word has an associated counter 212 which increments every time that data in the CAM word storage location matches data in the comparand register 232. This incrementing is triggered by the priority encoder 300 through the increment line 220 which is connected to the counter 212 as shown in FIG. 2. Having a counter 212 associated with every stored word within the CAM array 104 provides information on how often during any defined word a specific CAM word was used, as well as the total number of times that word was used. An aging algorithm can then determine which stored words within the CAM 104 have been "least used". This information can indicate the amount of traffic generated by a specific destination of router 100, or generated by a specific network. In situations in which a high volume of data is being routed, the information can be used to determine which memory locations should have their stored words discarded or over-written.

The priority encoder 300 only responds to one active input, and ignores all other active inputs. The priority encoder 300 then generates a numerical output 312 uniquely representing the location in the CAM of the match line 216 bit to which the priority encoder had responded.

A search is conducted for the addresses of a location with data matching the data in the comparand register 232. Data in the comparand register is simultaneously compared, bit by bit, with the data stored in every word of the CAM 104. When a match of all the bits occurs of a specific word within the CAM 104, the match detector 228 associated with that word de-activates its match line 216. During any particular search, more than one of match lines 216 can be activated. This is because, as stated, the comparand can contain "wild-card" or "don't-care" conditions. However, the priority encoder 300 identifies only one priority location, for example, the highest priority location. It is possible that no match will be detected, so that the non-matching data word may need to be written (learned) within the CAM 104.

Figure 3:
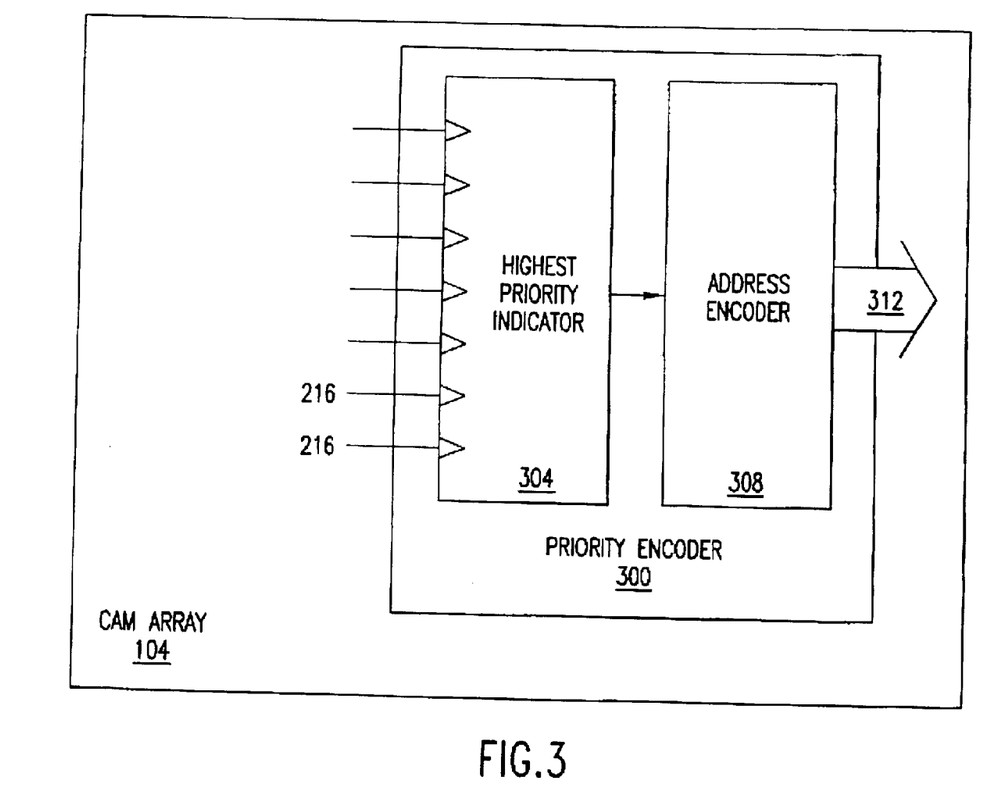
FIG. 3 is a block diagram of the priority encoder.

The priority encoder 300 of the present invention is comprised of two sections 304 and 308 as shown in FIG. 3. The highest priority indicator 304 is followed by the address encoder 308. Every memory location in the CAM array 104 has exactly one input into the highest priority indicator 304. Although many matches can simultaneously occur during a CAM search, one purpose of the highest priority indicator 304 is to select a single memory location and provide that location to an address encoder 308. Thus, the highest priority indicator 304 will always indicate only one location within the CAM array 104 to the address encoder 308. The address encoder 308 then outputs an address as shown by the arrow 312.

Figure 4:
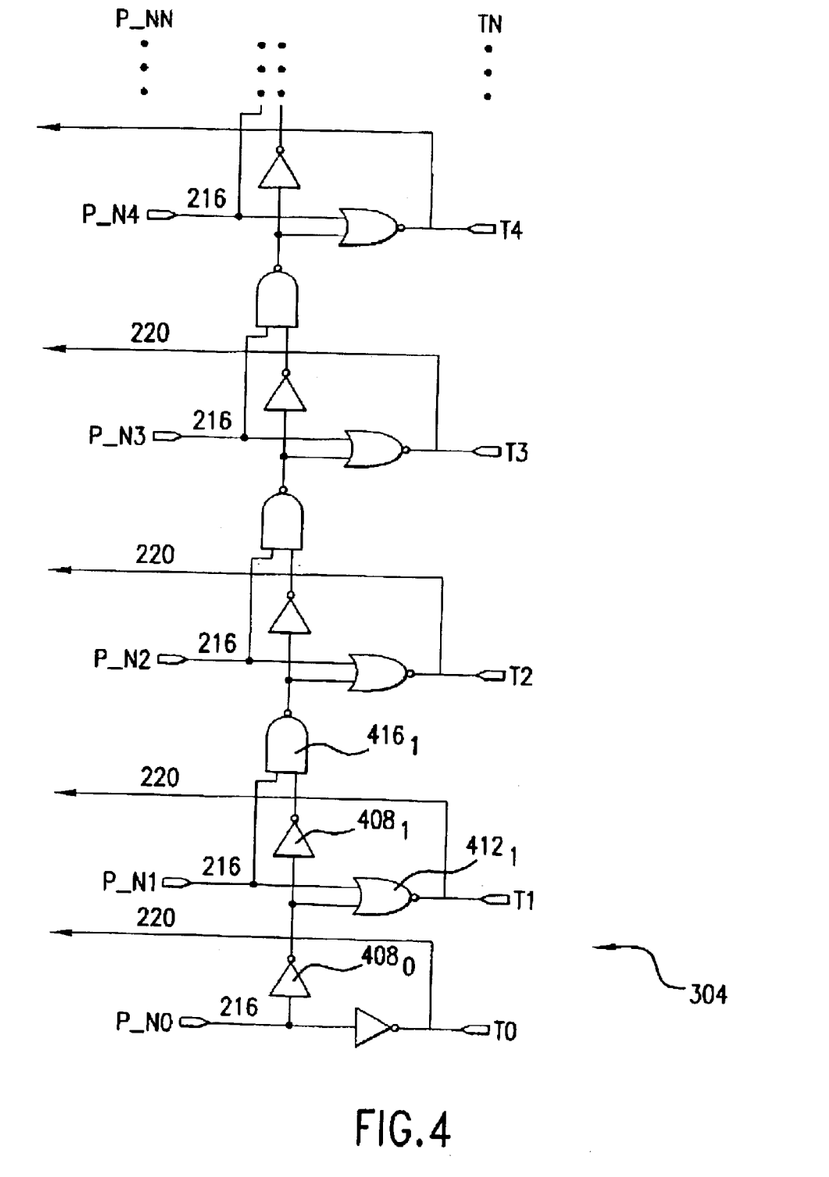
FIG. 4 is a schematic diagram of the highest priority indicator.

FIG. 4 shows an exemplary embodiment of the highest priority indicator (HPI) 304. The highest priority indicator 304 operates as follows. In an initial state, all inputs P_N0 through P_NN are at a state of "1" which is the inactive state, while all the outputs T0 through TN are in the inactive state of "0". Whenever any input P_N* goes to the active state of "0", this active input disables all the inputs above it in the chain, forcing their associated outputs to remain inactive ("0"). Only the output T* associated with this input P_N* becomes active, and goes to the state of "1". An active input on an input P_N0 will cause the output T1 of P_N1 to be inactive because of the inverter $408_0$ which feeds into the NOR gate $412_1$. Similarly, each succeeding output will be disabled partially by the NAND gates $416_{1-N}$.

Thus, the bottom of the highest priority indicator 304 has the highest priority, and the priority descends toward the top. Accordingly, input P_N0 will always have the highest priority over any other input. Therefore, if any number of inputs are simultaneously active, the highest priority indicator will activate only the output associated with the highest priority active input, leaving all other outputs inactive.

Returning to FIG. 4, each output of the highest priority indicator 304 is also connected to a corresponding count enable input 220 of a corresponding counter 212. When a matching word is the highest priority word, the HPI 304 output associated with this word goes to a state of "1", enabling the counter 212 to increment. The CAM array 104 periodically conducts a search operation on all the counters 212 in the CAM to identify counters with a low count. A low count in a counter 212 indicates infrequent access to the client whose address is stored in the CAM word associated therewith. A low count therefore indicates that this location in the CAM array 104 may be vacated thus available for new data. Once the clearing process is completed, all the counters 212 in the CAM array 104 are reset to zero to start another counting period.

Figure 5:
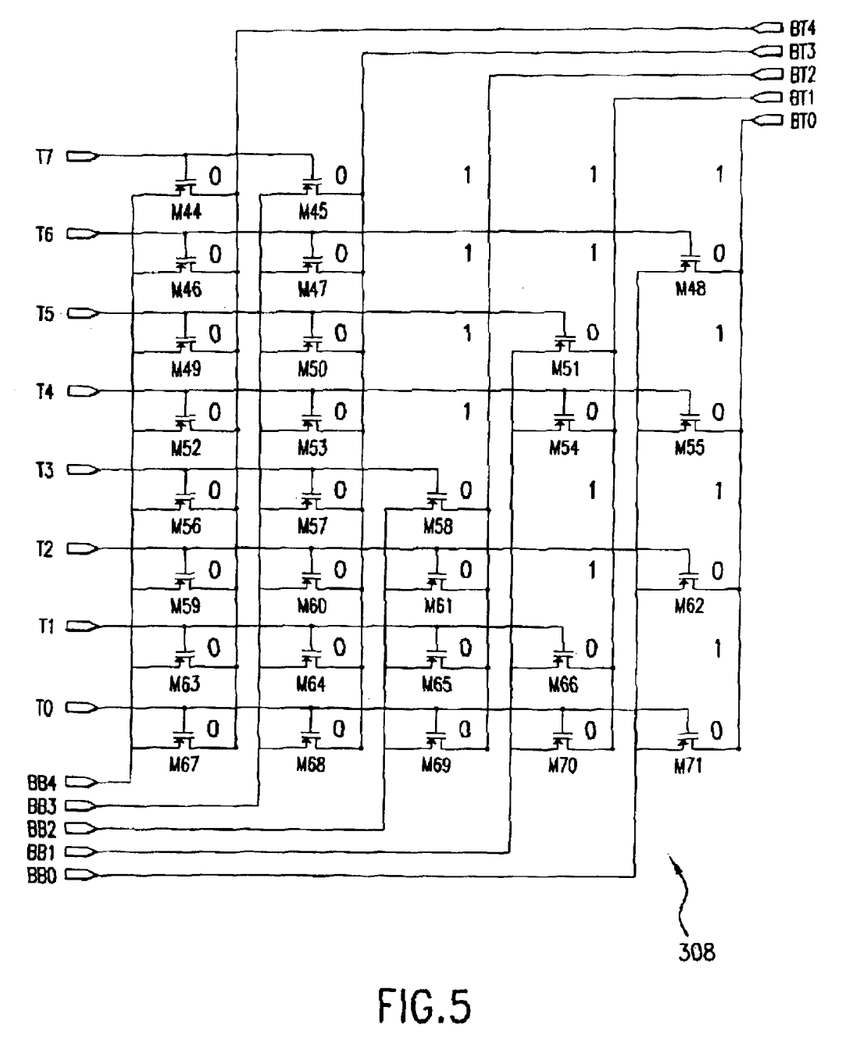
FIG. 5 is a schematic diagram of the address encoder.

Many methods could used to convert the output of the highest priority indicator 304 into an address. The simplest method is that of a look-up table, although the present invention should not be limited only to that conversion method. FIG. 5 shows an 8 bit section of a 32 bit look-up table which comprises the address encoder 308 of the present invention. The inputs BB0 through BB4 are connected to ground, and the pins marked as BT0 through BT4 are each connected to the power supply via a separate resistor.

The operation of the address encoder 308 will now be explained with a simple example. Assume that the input T0 is "1", turning ON all the transistors M67 through M71 connected thereto. The resulting current through the turned ON transistors causes the voltage at the output pins BT0 through BT4 to go down to zero volts, thus forming the binary address output value of 00000. Now suppose instead the input T3 is active, transistors M56–58 would be enabled so that only the outputs BT2, BT3, and BT4 go to 0 volts, while BT0 and BT1 remain high. Thus the binary address value 00011 would be present on the output pins BT0 through BT4.

The priority encoder 300 of the present invention could also be implemented in a hierarchical fashion out of many smaller priority encoders. For example, a 256 input priority encoder could be constructed out of 17 sixteen-input priority encoders. Each of sixteen inputs would go to one of sixteen priority encoders and the 17th input determines a priority among the first sixteen priority encoders. Each of the sixteen priority encoders could be further constructed using five four input priority encoders. The fifth priority encoder used to select from among the first four priority encoders.

Figure 6:
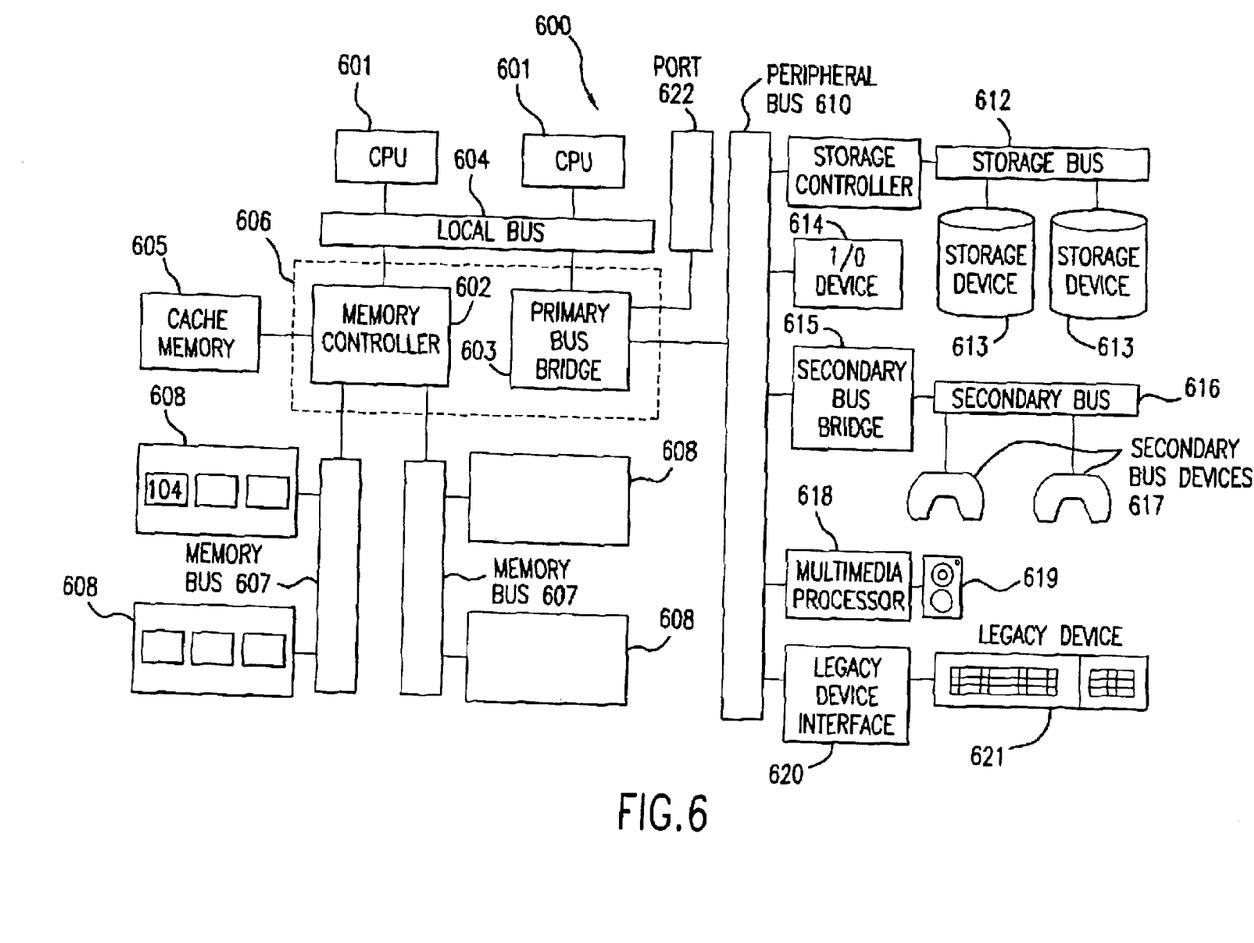
FIG. 6 shows use of a CAM in accordance with the present invention used within a processor system.

FIG. 6 illustrates an exemplary processing system 600 which utilizes the CAM array 104 of the present invention. The processing system 600 includes one or more processors 601 coupled to a local bus 604. A memory controller 602 and a primary bus bridge 603 are also coupled the local bus 604. The processing system 600 may include multiple memory controllers 602 and/or multiple primary bus bridges 603. The memory controller 602 and the primary bus bridge 603 may be integrated as a single device 606.

The memory controller 602 is also coupled to one or more memory buses 607. Each memory bus accepts memory components 608. Any one of memory components 608 may contain one or more CAM arrays 104 in accordance the invention described above in connection with FIGS. 1–5.

The memory components 608 may be a memory card or a memory module. The memory components 608 may include one or more additional devices 609. The memory controller 602 may also be coupled to a cache memory 605. The cache memory 605 may be the only cache memory in the processing system. Alternatively, other devices, for example, processors 601 may also include cache memories, which may form a cache hierarchy with cache memory 605. If the processing system 600 include peripherals or controllers which are bus masters or which support direct memory access (DMA), the memory controller 602 may implement a cache coherency protocol. If the memory controller 602 is coupled to a plurality of memory buses 607, each memory bus 607 may be operated in parallel, or different address ranges may be mapped to different memory buses 607.

The primary bus bridge 603 is coupled to at least one peripheral bus 610. Various devices, such as peripherals or additional bus bridges may be coupled to the peripheral bus 610. These devices may include a storage controller 611, an miscellaneous I/O device 614, a secondary bus bridge 615, a multimedia processor 618, and an legacy device interface 620. The primary bus bridge 603 may also coupled to one or more special purpose high speed ports 622. In a personal computer, for example, the special purpose port might be the Accelerated Graphics Port (AGP), used to couple a high performance video card to the processing system 600.

The storage controller 611 couples one or more storage devices 613, via a storage bus 612, to the peripheral bus 610. For example, the storage controller 611 may be a SCSI controller and storage devices 613 may be SCSI discs. The I/O device 614 may be any sort of peripheral. For example, the I/O device 614 may be an local area network interface, such as an Ethernet card. The secondary bus bridge may be used to interface additional devices via another bus to the processing system. For example, the secondary bus bridge may be an universal serial port (USB) controller used to couple USB devices 617 via to the processing system 600. The multimedia processor 618 may be a sound card, a video capture card, or any other type of media interface, which may also be coupled to one additional devices such as speakers 619. The legacy device interface 620 is used to couple legacy devices, for example, older styled keyboards and mice, to the processing system 600.

The processing system 600 illustrated in FIG. 6 is only an exemplary processing system with which the invention may be used. While FIG. 6 illustrates a processing architecture especially suitable for a general purpose computer, such as a personal computer or a workstation, it should be recognized that well known modifications can be made to configure the processing system 600 to become more suitable for use in a variety of applications. For example, many electronic devices which require processing may be implemented using a simpler architecture which relies on a CPU 601 coupled to memory components 608 and/or memory devices 609. The modifications may include, for example, elimination of unnecessary components, addition of specialized devices or circuits, and/or integration of a plurality of devices.

While the invention has been described and illustrated with reference to specific exemplary embodiments, it should be understood that many modifications and substitutions can be made without departing from the spirit and scope of the invention. Accordingly, the invention is not to be considered as limited by the foregoing description but is only limited by the scope of the appended claims.

What is claimed as new and desired to be protected by Letters Patent of the United States is:

1. A content addressable memory, comprising:

a plurality of memory storage locations, each memory storage location having an associated match line for indicating if a search word matches a word stored in the memory storage location and an associated counter; and a priority encoder circuit having a plurality of inputs respectively coupled to receive signals from said match lines, said priority encoder adapted to indicate a priority match among said match lines indicating a match;

wherein said priority encoder is adapted to increment said counter associated with said memory location identified by said priority encoder as having a priority match.

2. The content addressable memory of claim 1, wherein said priority match is a highest priority match.

3. The content addressable memory as in claim 2, wherein said priority encoder comprises a highest priority indicator circuit having said plurality of inputs and a plurality of outputs, one of said outputs is adapted to be active at a time to indicate a highest priority of signals present at said inputs.

4. The content addressable memory of claim 2, wherein said priority encoder circuit further comprises an address encoder for indicating an address associated with the memory storage location having a match.

5. The content addressable memory of claim 4, wherein said address encoder comprises a lookup table.

6. The content addressable memory as in claim 1 wherein the plurality of counters each associated with a storage location within said memory are adapted to enable a least frequently used logic circuit.

7. The content addressable memory of claim 6, wherein said least frequently used logic circuit is adapted to purge the storage locations within the said content addressable memory when a count within the counter associated with said storage location is lower than a predetermined level.

8. The method of claim 6, wherein said predetermined priority is a highest priority.

9. A method of operating a content addressable memory array, comprising:

searching a plurality of storage locations of said array for stored words which match a search word;

determining which, if any, of said matching words have a predetermined priority;

counting, for each of said stored words, the number of times the stored word is identified as having said predetermined priority;

periodically purging stored words from said array which have an associated count value below a predetermined threshold; and beginning the counting anew for each of said stored words after said purging operation.

10. A router, comprising:

a plurality of message receiving inputs;

a plurality of message transmitting outputs; and a semiconductor chip containing a content addressable memory, said content addressable memory is adapted to route messages from said inputs to said outputs, said chip comprising:

a plurality of memory storage locations, each memory storage location having an associated match line for indicating if a search word matches a word stored in the memory storage location, and an associated counter; and a priority encoder circuit having a plurality of inputs respectively coupled to receive signals from said match lines, said priority encoder is adapted to indicate a priority match among said match lines indicating a match;

wherein said priority encoder is adapted to increment said counter associated with said memory location identified by said priority encoder as having a priority match.

11. The router of claim 10, wherein said priority match is a highest priority match.

12. The router as in claim 11, wherein said priority encoder comprises a highest priority indicator circuit having said plurality of inputs and a plurality of outputs, one of said outputs is adapted to be active at a time to indicate a highest priority of signals present at said inputs.

13. The router of claim 11, wherein said priority encoder circuit further comprises an address encoder for indicating an address associated with the memory storage location having a match.

14. The router of claim 13, wherein said address encoder comprises a lookup table.

15. The router of claim 10, wherein the plurality of counters each associated with a storage location within said memory are adapted to enable a least frequently used logic circuit.

16. The router of claim 15, wherein said least frequently used logic circuit is adapted to purge the storage locations within the said content addressable memory when a count within the counter associated with said storage location is lower than a predetermined level.

17. A processor circuit, comprising:

a processor; and a content addressable memory circuit for exchanging data with said processor, said content addressable memory circuit, comprising:

a plurality of memory storage locations, each memory storage location having an associated match line for indicating if a search word matches a word stored in the memory storage location, and an associated counter; and a priority encoder circuit having a plurality of inputs respectively coupled to receive signals from said match lines, said priority encoder is adapted to indicate a priority match among said match lines indicating a match;

wherein said priority encoder is adapted to increment said counter associated with said memory location identified by said priority encoder as having a priority match.

18. The processor circuit of claim 17, wherein said priority match is a highest priority match.

19. The processor circuit as in claim 18, wherein said priority encoder comprises a highest priority indicator circuit having said plurality of inputs and a plurality of outputs, one of said outputs is adapted to be active at a time to indicate a highest priority of signals present at said inputs.

20. The processor circuit of claim 19, wherein said priority encoder circuit further comprises an address encoder for indicating an address associated with the memory storage location having a match.

21. The processor circuit of claim 20, wherein said address encoder comprises a lookup table.

22. The processor circuit of claim 17, wherein the plurality of counters each associated with a storage location within said memory are adapted to enable a least frequently used logic circuit.

23. The processor circuit of claim 22, wherein said least frequently used logic circuit is adapted to purge the storage locations within the said content addressable memory when a count within the counter associated with said storage location is lower than a predetermined level.

24. A content addressable memory comprising:

a plurality of memory storage locations, each having an associated match line for indicating a match of a word stored in an associated memory storage location with the search word;

a plurality of counters respectively associated with said memory storage locations; and a priority encoder circuit having a plurality of inputs respectively coupled to receive signals from said match lines for indicating a priority match among said match lines indicating a match and incrementing a counter associated with a memory location identified by said priority encoder as having a priority match.

25. The content addressable memory of claim 24, wherein said priority match is a highest priority match.

26. The content addressable memory as in claim 24, wherein said priority encoder comprises a highest priority indicator circuit having said plurality of inputs and a plurality of outputs, one of said outputs is adapted to be active at a tune to indicate a highest priority of signals present at said inputs.

27. The content addressable memory of claim 24, wherein said priority encoder circuit further comprises an address encoder for indicating an address associated with the memory storage location having a match.

28. The content addressable memory 27, wherein said address encoder comprises a lookup table.

29. A content addressable memory comprising:

a plurality of memory storage locations, each memory storage location having an associated counter for counting matches of a word stored in an associated memory storage location with a search word; and a least frequently used logic circuit for receiving the contents of said counters and indicating a least frequently used memory location.

30. The content addressable memory of claim 29, wherein said least frequently used logic circuit is adapted to purge the storage locations within the said content addressable memory when a count within the counter associated with said storage location is lower than a predetermined level.

* * * * *

UNITED STATES PATENT AND TRADEMARK OFFICE
CERTIFICATE OF CORRECTION

PATENT NO. : 6,934,797 B2
DATED : August 23, 2005
INVENTOR(S) : Alon Regev et al.

It is certified that error appears in the above-identified patent and that said Letters Patent is hereby corrected as shown below:

Column 1,
Line 61, "method" should read -- methods --.

Column 4,
Line 33, "could used" should read -- could be used --.

Column 5,
Line 20, "include" should read -- includes --;
Lines 30-31, "an miscellaneous" should read -- a miscellaneous --;
Line 33, "an legacy" should read -- a legacy --;
Line 34, "also coupled" should read -- also be coupled --;
Line 43, "an local" should read -- a local --;
Line 47, "an universal" should read -- a universal --;
Line 48, "via to" should read -- to --; and
Line 51, "to one" should read -- to --.

Column 8,
Line 41, "tune" should read -- time --.

Signed and Sealed this

Thirteenth Day of December, 2005

JON W. DUDAS
*Director of the United States Patent and Trademark Office*